Dec. 11, 1973     J. D. SEASE ET AL     3,778,348
NUCLEAR FUEL ELEMENT WITH AXIALLY ALIGNED FUEL
PELLETS AND FUEL MICROSPHERES THEREIN
Filed July 3, 1972

United States Patent Office 3,778,348
Patented Dec. 11, 1973

3,778,348
NUCLEAR FUEL ELEMENT WITH AXIALLY ALIGNED FUEL PELLETS AND FUEL MICROSPHERES THEREIN
John D. Sease and Francis E. Harrington, Knoxville, Tenn., assignors to the United States of America as represented by the United States Atomic Energy Commission
Continuation-in-part of application Ser. No. 115,118, Feb. 12, 1971, now Patent No. 3,683,975. This application July 3, 1972, Ser. No. 268,261
Int. Cl. G21c 3/26, 3/28
U.S. Cl. 176—67
2 Claims

ABSTRACT OF THE DISCLOSURE

Elongated single- and multi-region fuel elements are prepared by replacing within a cladding container a coarse fraction of fuel material which includes plutonium and uranium in the appropriate regions of the fuel element and then infiltrating with vibration a fine-sized fraction of uranium-containing microspheres throughout all interstices in the coarse material in a single loading. The fine, rigid material defines a thin annular layer between the coarse fraction and the cladding to reduce adverse mechanical and chemical interactions.

---

Figure 4:
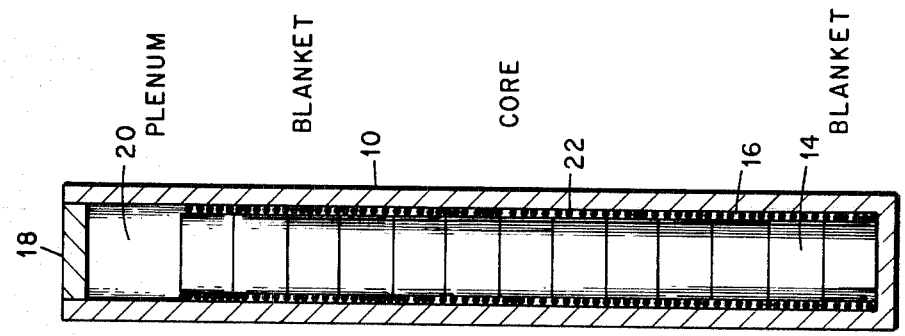

This application is a continuation-in-part of application Ser. No. 115,118, filed Feb. 12, 1971, now Pat. No. 3,683,975.

BACKGROUND OF THE INVENTION

The invention described herein was made in the course of, or under, a contract with the United States Atomic Energy Commission. It relates generally to methods for preparing nuclear fuel elements and to the resultant elements.

Considerable research and development is presently being expended toward the successful demonstration of a dual-region fuel element designed for use in a liquid metal fast breeder reactor (LMFBR). Because of their relatively advanced technology, mixed oxides such as (U, Pu)$O_2$ are prime candiates for the first cores of demonstration LMFBR reactors. Other fuel element materials, such as carbides, nitrides, or hypostoichiometric oxides of any of the fissionable elements and corresponding blanket materials, are also of interest. One of the fuel element designs for the LMFBR is a long, small diameter stainless steel tube filled by vibratory compaction with appropriate microspheres. The use of vibratory compaction in loading elongated fuel elements is well known in the art. In one method disclosed in U.S. Pat. No. 3,261,-378, issued on July 19, 1966, in the name of James E. Ayer et al. for "Method and Apparatus for Vibratory Compaction," tubular elements are packed with masses of different diameter spheres by loading the larger diameter spheres while vibrating the tubular element, introducing smaller spheres while holding the larger spheres in place by pressure, and thereafter subjecting the loaded tube to combined axial and radial vibration until a uniform close-packed configuration is obtained. This general technique has been followed and modified in various ways. In one method, commonly referred to as the "Sphere-Pac Process," an elongated fuel element which contains both fuel and blanket material in separate zones is prepared using different-sized microshperes. This type multi-zone fuel element is utilized in breeder reactors and generally comprises upper and lower blanket regions of fertile material, such as uranium-238 or thorium-232, and a central core region of fissile material, such as a mixture of uranium-238 and plutonium-239 dioxides. The lower blanket region is loaded first with large-sized $UO_2$ microspheres and then small-sized $UO_2$ microspheres are infiltrated, using vibration, around the large-sized microspheres. The core region is next loaded respectively with large- and small-sized microspheres of (U, Pu)$O_2$ using separate steps. Finally, the upper blanket region is loaded, first with large-sized $UO_2$ microspheres and then infiltrated with small-sized $UO_2$ microspheres. An empty plenum region is left above the microshperes for accumulation of any gases. In this manner, and because of the three distinct regions of the fuel element, the fabrication operation by vibratory compaction involved six distinct loading steps. Even with extreme care it was difficult to achieve a sharp distinction between the composition of the respective regions, with the plutonium-containing small-sized micropheres from the core region often entering the lower blanket region and the $UO_2$ small-sized microspheres from the upper blanket region entering similarly the core region.

Another method for preparing fuel elements for breeder reactors is disclosed in U.S. Pat. No. 3,517,431, issued on June 30, 1970, in the name of James E. Ayer for "Method of Making Combination Fuel Rods." In this method, a preselected amount of large diameter blanket material is loaded into the lower blanket region and vibratorily compacted. Then a preselected amount of large diameter fuel material of the same size is loaded into the core region and vibratorily compacted. Thereafter, a preselected amount of large diameter blanket material of similar size is loaded into the upper blanket. Next, a predetermined amount of a smaller diameter particle size material is introduced and vibratorily compacted. Once this smaller diameter material is in place in the lower blanket region, smaller diameter fuel material and blanket material are introduced separately and vibratorily compacted into the fuel and upper blanket regions, respectively. This method requires, as does the Sphere-Pac Process, six separate loadings and does not achieve the sharp distinction between the composition of the respective regions. In fact, it is not as suitable as the Sphere-Pac Process in providing distinct blanket and core regions. This is seen by the fact that in the Sphere-Pac Process, if any given region is under- or over-filled, adjustment can be made prior to proceeding to load the next region. In the Ayer method, the entire length of the fuel element is loaded with large diameter blanket and core materials and successive loadings of smaller diameter material for the corresponding blanket and core regions are made. If any given region is under- or over-filled, the only practical remedy is to remove all of the loaded material from the tubular container and repeat the sequence of steps.

Due to the number of loadings and infiltrations required, the aforementtioned processes suffer economic penalties in fabricational costs. Moreover, there is a contamination problem due, particularly, to the fine-sized microspheres containing plutonia. The small-sized material is very dusty and thus, during any handling of the material, some plutonia may be lost and the surrounding areas, including the closure weld of the fuel element container, may become contaminated. It is therefore an object of this invention to provide a more economic process which, in addition, obviates the previously encountered contamination problem for preparing elongated fuel elements via vibratory compaction.

SUMMARY OF THE INVENTION

In accordance with this invention, elongated fuel elements which may contain separate blanket and fuel regions may be prepared by loading all coarse material which contains plutonium and a portion of the uranium in appropriate regions of the fuel element, and infiltrating, with vibration, a fine-sized material consisting of depleted uranium.

Unlike the previous vibratory compaction methods, a sharp cutoff (e.g., within 0.03 in.) between the separate blanket and fuel regions is readily achieved. Inasmuch as the fine-sized material comprises only depleted uranium, this part of the fabrication operation can be carried out using only a contact facility (as opposed to hot cell facilities previously required for handling the fine-sized plutonium-containing microspheres). In a single-region fuel element the fine-sized material need not be depleted material but may be natural or enriched grade.

The product fuel elements of this invention may be visualized in four principal embodiments shown in FIGS. 1–4 respectively. Each fuel element consists of a tubular cylindrical clad or casing 10 closed at both ends containing a stacked array of a coarse material which may consist of large-size (400–600 microns) microspheres shown as open circles 12 or a stack of loose-fitting cylindrical pellets 14 which define an annulus 16 between the pellets and the container to permit fine-sized $UO_2$ microspheres 22 to easily pass through. The clad is sealed closed by an end cap 18. A gas space or plenum area 20 is provided for accumulation of fission product gases.

Figure 1:
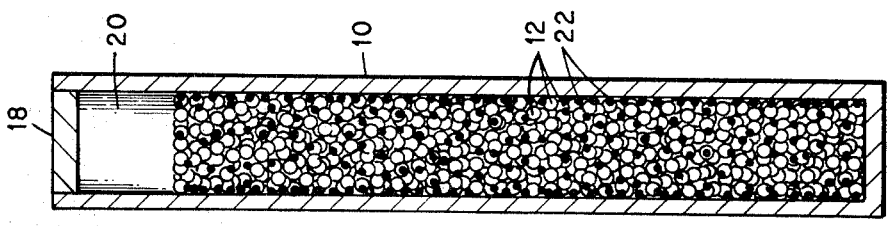

As a multi-region fuel element the embodiment shown in FIG. 1 consists of coarse material making up the blanket regions consisting of 400–600 micron $^{238}UO_2$ microspheres and the coarse material making up the core region consists of 400–600 micron $^{238}U$, $^{239}Pu$ $(U, Pu)O_2$ microspheres where the U:Pu weight ratio is 4:1. The fine-sized material, which is simultaneously infiltrated throughout the coarse microspheres over the entire length of the fuel element in a single loading, consists of $^{238}UO_2$ microspheres having a diameter no greater than 44 microns.

Figure 2:
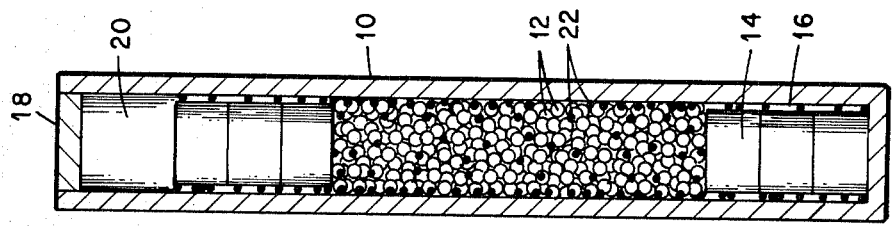

In a second multi-region fuel embodiment, as shown in FIG. 2, the coarse material making up the blanket regions consists of $^{238}UO_2$ pellets which are adapted to fit loosely within the tubular container and the coarse material making up the fuel region consists of 400–600 micron $(^{238}U, ^{239}Pu)O_2$ microspheres. The fine-sized material consists of $^{238}UO_2$ microspheres having a diameter no greater than 44 microns which is simultaneously infiltrated in a single loading throughout the core region and in the annulus between the container wall and the loose-fitting pellets in the blanket regions.

Figure 3:
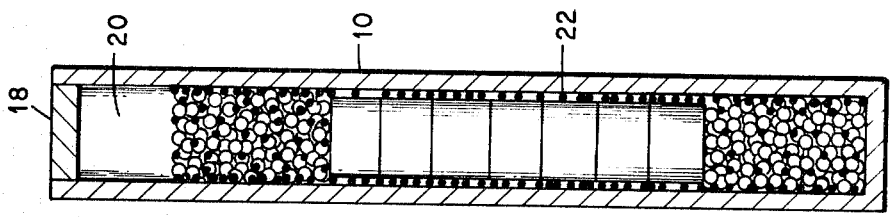

In a third embodiment, as shown in FIG. 3, the coarse material of the fuel region consists of pellets of uranium and plutonium oxide and the blanket consists of 400–600 micron $^{238}UO_2$ particles, where both core and blanket are infiltrated with fine-sized material.

The fourth embodiment, as shown in FIG. 4, viewed as a multi-region element, consists of a coarse fraction consisting of fuel pellets in the core and fertile pellets in the blanket region with a fine-sized fraction of small-sized microspheres infiltrated between the pellets and the cladding.

The embodiments shown in FIGS. 1 and 4 can be viewed as single-region or multi-region elements. As a single-region element, the embodiment shown in FIG. 1 would consist of a charge of fuel or fertile coarse material as large-sized microspheres 20 and a charge of smaller-sized microspheres 22 infiltrated within the interstices of the larger-sized microspheres of the same composition. Similarly, the embodiment shown in FIG. 4 would consist of loose-fitting pellets 14 with a charge of small microspheres of the same composition infiltrated between the clad and the pellets.

By "loose-fitting" pellets we refer to pellets which have been shaped or machined to obtain as nearly as normal manufacturing tolerances allow to obtain a uniformly close fit between the fissionable or fertile pellets and the cladding in an effort to avoid operational failure of the fuel element due to formation of hot spots which result from void spaces between core and clad. Experience has shown, however, that it is practically impossible to attain absolutely uniform and continuous contact between the coarse material, as larger sized spheres or pellets, and the cladding. Moreover, even in cases when such a condition is approximated, it has been found to lead to adverse mechanical and chemical interaction between the coarse material and the clad.

DESCRIPTION OF THE PREFERRED EMBODIMENTS

The present invention is broadly applicable to preparing elongated fuel elements containing blanket and/or core materials by vibratory compaction, utilizing any of the well-known compounds of fissionable elements, such as oxides, carbides, nitrides, etc., and corresponding blanket materials. To facilitate an understanding of the invention, the method will be described hereinafter with particular reference to the preparation of a three-region stainless steel clad LMFBR tubular element by the U-Fine Process. We term this a preferred embodiment because the twofold advantages of a more efficient fuel loading and reduced fuel-clad interaction are realized in a multi-region fuel as compared to a single-zone or -region fuel where only the advantage in reduced fuel-clad interaction is realized. The three regions consist of two $^{238}U$-containing blanket (end) regions and a central core region containing nominally 80 wt. percent $^{238}U$ and 20 wt. percent $^{239}Pu$.

In the first embodiment, the fuel element is prepared using various-sized microspheres. The loading operation is commenced by preplacing coarse $^{238}UO_2$ microspheres (400–600 microns) in the lower blanket region of the stainless steel tubular container. While the $UO_2$ coarse microspheres may be loaded with vibration (e.g. about 30 seconds), the lower blanket region may be loaded with this coarse fraction by carefully pouring the $UO_2$ microspheres into the tubular container. The exact location of the interface between the lower blanket region and the core region may be established by measuring from the top of the fuel element a precalculated distance or by loading a precalculated amount of microspheres into the tubular container.

After the coarse fraction for the lower blanket region is placed, coarse $(U, Pu)O_2$ microspheres (400–600 microns) are loaded into the tubular container above the coarse $UO_2$ microspheres making up the lower blanket region. This loading may be carried out with short-duration vibrations (about 30 seconds) or by pouring the coarse microspheres slowly into the container. The top interface of this core region is established in the same manner as that of the lower blanket region. Finally, a coarse fraction of $^{238}UO_2$ microspheres (400–600 microns) are loaded into the tubular container in stacked relationship to the coarse $(U, Pu)O_2$ core microspheres. This loading, also, may be carried out with short-duration vibrations (about 30 seconds) or by pouring the coarse microspheres slowly into the container. The depth of this blanket region is established by the means described above.

Upon completion of loading all of the coarse microspheres, a screen retainer funnel is lowered onto the top of the coarse microspheres in the upper blanket region and held in place by a suitable device such as a fastener. By this arrangement, loading of the fine-sized $^{238}UO_2$ microspheres is facilitated and the coarse microspheres are maintained in their relative position during subsequent vibratory loading of the fine-sized fraction. The loading of the fine-sized $UO_2$ microspheres should be carried out under an atmosphere which has a minimum moisture content, such as about <2000 p.p.m. As would be expected with any high surface area solid particles, moisture sorption is a problem which affects the reproducibility of loading the fine-sized fraction In filtration of the fine-sized $UO_2$ microspheres simultaneously through the entire length of the fuel element may be effected using any conventional vibratory apparatus such as that used in the process described in U.S. Pat. No. 3,261,378. See also "Sol-Gel Urania-Plutonia Microsphere Preparation and Fabrication Into Fuel Rods," International Symposium Plutonium Fuels Technology, Scottsdale, Arizona, 1967, Nucl. Met., vol. 13, pp. 195–210, American Institute of Mining, Metallurgical and Petroleum Engineers, New York, 1968, and J. D. Sease et al., "Sphere-Pac and Pelletization of (U, Pu)$O_2$," Symposium on Sol-Gel Processes and Reactor Fuel Cycles, May 4–7, 1970, Gatlinburg, Tenn., AEC Conf. 700502, May 1970. The parameters of the vibratory compaction process may vary widely with regard to angle, mode, and amplitude of vibration. A suitable amplitude of vibration can be obtained by using a 60 cycle/sec. vibratory feeder which is mounted at 45° to the normal feeding position. The fuel pin to be vibrated is then clamped to this feeder in a vertical position.

Advantageously, the depleted $UO_2$ fine-sized microspheres, which constitute about 25 percent of the core section, can be prepared in a contact handling facility, thus reducing the total material that must be processed in a remote handling facility by this amount; and the contamination problem of handling fine-sized depleted $UO_2$ microspheres is orders of magnitude less than with handling fine-sized plutonium-containing microspheres.

The time of infiltration of the fine-sized fraction may also vary over a wide range, depending upon the condition of the fine microspheres and packing quality of the coarse bed. Typically, for loading 0.250-inch-diameter fuel beds greater than 16 inches long, the infiltration time is approximately 1½ inches per minute. A suitable time for infiltrating the fine-sized $UO_2$ through a 48-inch-long coarse fraction bed is 30 minutes.

In another embodiment, $UO_2$ pellets, which are adapted to fit loosely into the tubular container, are substituted as the coarse fraction for the coarse $UO_2$ microspheres. In this embodiment, $UO_2$ loose-fitting pellets are loaded into the container to form the lower blanket region, coarse (U, Pu)$O_2$ microspheres (400–600 microns) are next loaded to form the core region, and corresponding loose-fitting $UO_2$ pellets are loaded on top of the (U, Pu)$O_2$ microspheres to form the upper blanket region. The pellets should be of a size to provide an annulus between the pellets and the tubular container of a sufficient size to permit the fine-sized $UO_2$ microspheres to easily pass through. Where the $UO_2$ microspheres have a diameter no greater than 44 microns, the clearance between the loaded pellets and the wall of the container should be 200–400 microns.

Upon loading the $UO_2$ pellets into the upper blanket region, a weighted rod is lowered on top of the $UO_2$ pellets and the fine-sized $UO_2$ microspheres infiltrated simultaneously throughout the three-region fuel element by passing the $UO_2$ microspheres through the annulus between the pellets and the container wall. In this manner the fine-sized $UO_2$ microspheres infiltrate around the loosefitting pellets and center the pellets, providing for smear densities of greater than 90 percent of theoretical. In a similar manner, pellets may be used in the core region or may constitute the entire fuel loading in a single region fuel.

Thus, it may be seen that even where $UO_2$ pellets are substituted for coarse $UO_2$ microspheres, the entire fuel element (blanket regions or core regions is vibratorily infiltrated with fine-sized $UO_2$ microspheres in a single loading. Advantageously, this embodiment permits lower tolerances than previously required with pelletized fuels and even permits the use of cracked or chipped pellets, since the fine-sized $UO_2$ microspheres infiltrate around the pellets in the annulus between the pellets and the wall of the container to fill any voids created by cracks or chips and provide increased physical stability. The reduced tolerances permit use of sintered pellets without the previously required grinding step needed for accurate sizing. This reduces the quantity of recycle material. This embodiment also tends to reduce the pellet-cladding interaction.

Having described the invention in general terms, the following examples are given by way of illustration to further describe in greater detail the U-Fine Process.

EXAMPLE I

A .250" O.D. x .230" I.D. x 5' long stainless steel tube was loaded with binary mixtures of microspheres to simulate a typical oxide-fueled fast breeder ractor fuel pin. In this fuel pin we loaded two 12" long bottom and top blanket sections and a 24" long fueled core section. The coarse microspheres for each section of the fuel pin were 400–600 microns in diameter. The coarse fraction in the blanket regions was depleted $UO_2$ microspheres. In the core section the coarse fraction was $ThO_2$ microspheres to simulate the (U, Pu)$O_2$ fuel for FBR's.

In loading the fuel pin, first 50.4 grams of the coarse $UO_2$ microspheres were weighed out and poured into the fuel pin with the aid of a funnel to form the 12" length of the bottom blanket section. Next, 91.8 grams of coarse $ThO_2$ microspheres were weighed out and poured in on top of the bottom blanket microspheres to form the 24" long core section. The top blanket section was made by weighing out another 50.4 grams of the coarse $UO_2$ microspheres and pouring in the fuel pin on top of the core section. During loading of the coarse fractions the fuel pin was clamped in a 60 cycle/sec. vibratory compaction apparatus similar to that described by Ayer's 1966 patent, 3,261,378. Vibration was applied during the loading of the coarse fractions which took approximately 1 minute each to load the blanket sections and 2 minutes for the core section.

After loading the coarse fraction, a screen funnel was placed on top of the microsphere column. The screen used to retain the coarse fractions had openings of 250 microns. The loading of the fine fraction was accomplished by loading 74.6 grams of depleted $UO_2$ microspheres into the screen funnel. Vibration was then applied for 30 minutes to infiltrate the 48" long coarse bed with the fine $UO_2$ microspheres.

EXAMPLE II

A fuel pin of the same description as in Example I was loaded. In this example, the only difference in the loading was that pellets were used in place of the coarse microspheres for the bottom and top blanket sections. The pellets used for the bottom and top blanket sections were depleted $UO_2$ and were solid right circular cylinders with a nominal O.D. of .208" x .250" height. The pellets had a density of 95 percent of theoretical.

The loading of the fuel pin was accomplished by first sliding 12" of $UO_2$ pellets into the fuel pin. Next, 91.8 grams of coarse $ThO_2$ microspheres were poured in on top of the blanket pellets to form the core section and compacted by vibration as in Example I. Another 12" section of $UO_2$ pellets was then placed on top of the core coarse microspheres. A 200-gram ⅛" diameter weighed rod was then placed on top of the top blanket pellet and 47.92 grams of depleted $UO_2$ fine microspheres introduced. Vibration was then applied for 15 minutes to infiltrate the fines into the voids.

EXAMPLE III

Sintered $UO_2$ right cylindrical pellets having a maximum diameter of 0.50 in. and 1.0 in. in length are placed in a Zircaloy tube having an inner diameter of about 0.53. The height of the column of pellets may be, for example, several feet. The oxide for the pellets may be obtained using conventional sol-gel or other suitable processes, and the uranium may be either of natural abundance or slightly enriched in one of the fissionable isotopes.

Thereafter, microspheres of $UO_2$, of the same uranium assay as the pellets, are vibratorily infiltrated throughout all of the interstices between pellets and fuel tube. These microspheres are made by sol-gel techniques and are in the range 40–50 microns in size. Therefore, they flow freely into these interstices. The conditions of vibration are the same as utilized in the manufacture of a three-region fuel element as described in the previous examples. The resulting fuel loading has a density of about 85–90 percent of theoretical, approaching the density of the fuel pellets. The exact final density depends upon the density of the components.

In a similar manner, (Pu-U)$O_2$ or (Th-U)$O_2$ pellets may be loaded into a fuel tube and all interstices filled with microspheres.

In irradiation testing, simulated fuel elements prepared from vibratorily compacted sol-gel microspheres have exhibited less reaction with fuel cladding than those prepared using only pellets. Accordingly, a layer of microspheres surrounding pellets is expected to give rise to reduced fuel-cladding interactions. This improvement together with cost savings in the preparation of pellets due to lower tolerances and reduction of recycle material are the important advantages of our development.

What is claimed is:

1. A fuel element for a nuclear reactor comprising a closed elongated metal or alloy tube, a stack of loose-fitting axially aligned pellets of a dense uranium compound selected from the group consisting of an oxide, carbide, and nitride of uranium and a layer of small-sized microspheres of said selected compound between said tube and said pellets which substantially fill the interstices or open volume between said pellets and said tube.

2. The element of claim 1 in which the diameter of the small-sized microspheres is no greater than about 50 microns.

References Cited
UNITED STATES PATENTS

| | | | |
|---|---|---|---|
| 3,261,378 | 7/1966 | Ayer et al. | 264—.5 |
| 3,669,832 | 6/1972 | Boettcher | 176—91 SP |
| 3,683,975 | 8/1972 | Sease et al. | 176—73 X |
| 3,362,882 | 1/1968 | Sofer et al. | 176—18 |

FOREIGN PATENTS

| | | | |
|---|---|---|---|
| 1,186,652 | 4/1970 | Great Britain | 176—91 SP |

BENJAMIN R. PADGETT, Primary Examiner

R. S. GAITHER, Assistant Examiner

U.S. Cl. X.R.

176—73, 91 SP; 264—.5